Feb. 22, 1949. A. C. WEIBY 2,462,583
TEAT CUP
Filed June 4, 1945
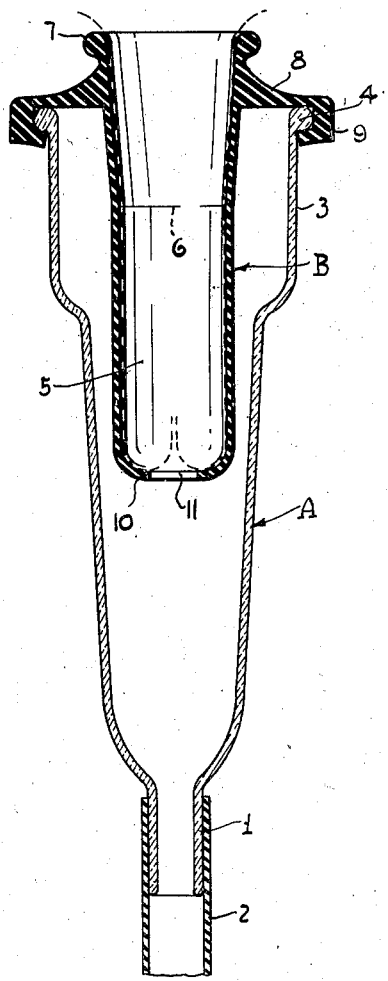
Inventor
ALFRED C. WEIBY
By Carlsen + Hazle
Attorneys Patented Feb. 22, 1949

2,462,583

UNITED STATES PATENT OFFICE 2,462,583

TEAT CUP

Alfred C. Weiby, Minneapolis, Minn., assignor to Solar Corporation, Milwaukee, Wis., a corporation of Delaware Application June 4, 1945, Serial No. 597,525

3 Claims. (Cl. 31—84)

This invention relates to teat cups for milking machines and the primary object is to provide a novel, efficient and practical construction of teat cup design and assembly which will substantially improve the process and results of dairy machine milking.

More particularly the objects are to provide a teat cup that is so formed as to prevent constriction of the teat at the base of the udder, to prevent the teat receiving tube or receptacle from creeping up on the udder, and also to prevent the teat from being drawn into the base of the outer shell, while also preventing any teat contact or manipulation that will tend to constrict the teat at the entrance of the teat canal. These and other objections, some or all of which are found in prior milkers that have come to my attention, are here overcome by so forming and mounting the teat receptacle and its supporting cap that they will impart a proper and natural grip on the teat, with a gentle yet firm massaging action resulting in very effective and efficient milking.

In the accompanying drawing in which a preferred embodiment of the invention is illustrated—

The single figure is a diametrical sectional elevation taken longitudinally through the device, and with the teat indicated in dotted lines.

Referring to the drawing by reference characters A designates the outer shell or receptacle, the same being preferably made from plastic or other substantial rigid material. This shell has a general over-all taper, terminating at its reduced lower end in a nipple 1 for detachable frictional engagement with the suction hose or tube 2, while the upper somewhat cylindrical end portion 3 of the shell terminates in an annular outturned bead 4.

The teat receiving and engaging receptacle B is formed of flexible, elastic material, such as rubber, and includes a tube-like portion 5 that is generally cylindrical except that it is preferably flared outwardly from about point 6 to its upper extremity where it terminates in a bead 7. Below the bead 7 the teat receptacle B is formed with an integral outwardly extending collar 8 peripherally terminating in a downwardly and inwardly turned flange 9 which is flexed over the bead 4 to frictionally and removably attach the receptacle B with respect to the shell A while also sealing the juncture of the two. The parts 8—9 may also be referred to as a cap supporting the tube 5. The lower end of the tube has an inwardly turned flange 10 within which is a central port or perforation 11.

In operation suction is intermittently applied through the tube 2, in conventional manner from a pump (not shown), to create vacuum pulsations within the shell A, and the resulting action alternately constricts and expands the flexible tube 5 to squeeze the teat and draw milk from it.

It may here be noted that since the lower or tube end 5 of the receptacle B is freely suspended, i. e., does not have direct support with the shell A it is free to move in suspension, and since the cap collar 8 has considerable flexibility or resiliency between the tube 5 and bead 4 the entire teat receptacle may reciprocate up and down with respect to the shell A, thus effectively absorbing the shock produced by each relatively downward pull created by the pump action.

It will also be noted that since the upper end of the receptacle B does not have a teat gripping flange there is no tendency to constrict the teat at the base of the udder, as is frequently required in other devices. To compensate for the absence of such a flange, and to otherwise insure proper positioning of the teat in the receptacle B, I provide the flange 10 at the lower or free end of the tube 5. This flange 10 gives the teat proper support at its tip and thus not only prevents the tube from creeping up on the teat and udder but effectively prevents the teat from being drawn down into the base of the outer shell, an action which has a tendency to improperly constrict the teat at the entrance of the teat canal.

It is also found that with this construction the contour formation of the teat receptacle prevents so-called wet milking, an important factor from the standpoint of sanitation.

The tube 5 may have its interior surface roughened to resemble a calf's tongue, although such roughening is not illustrated in the drawings. It is here sufficient to note that the teat receptacle B is so formed as to give the most comfortable and natural fit, is easy to apply and remove, and will support the teat as against all distorting and displacement tendencies, thus insuring maximum milking efficiency.

It is understood that suitable modifications may be made in the design and structural details of the invention as herein disclosed, and in the method of operation set forth, providing such modifications come within the spirit and scope of the appended claims. Having now therefore fully illustrated and described a preferred embodiment of the invention, what I claim to be new and desire to protect by Letters Patent is:

1. A teat cup device for milking machines comprising an outer shell of relatively rigid material and having a suction opening therein, a flexible collar releasably secured to the upper end of the shell and having an integral teat receiving tube extending downwardly into the shell from a point spaced radially inwardly from the outer periphery of the shell, and with the lower end of the tube being suspended for free movement within the shell, whereby the entire tube may move axially of the shell when the collar is flexed under pulsating action produced by intermittent suction effected through the suction opening, the tube being of a length substantially equal to the length of a teat with the lower end of the teat located at the lower end of the tube when the latter is in position on a teat and the lower end of the tube having an inwardly directed flange forming a bottom wall support for the lower end of the teat.

2. A teat cup for milking machines comprising an outer shell adapted for connection with a source of vacuum, a flexible teat receptacle of generally cylindrical form disposed axially of the shell and having an upper slightly funnel-shaped portion to bear against the upper end of the teat and adjacent udder surfaces, said funnel shaped portion extending above the upper extremity of the shell, and the lower portion of the receptacle extending downwardly into the shell, the sole means of support for the receptacle in the shell consisting of a flexible collar extending integrally from the receptacle, at a point below the top of said portion, and outwardly for peripheral attachment with the shell, the teat receptacle being of a length substantially equal to the length of a teat with the lower end of the teat located at the lower end of the receptacle when the latter is in position on a teat and the lower end of the teat receptacle being closed except for a central milk duct to thereby impinge endwise against and give support to the lower end of the teat.

3. A teat cup for milking machines comprising a generally tapered, elongated shell, a teat receptacle of generally cylindrical form extending axially into the shell at its larger end, the teat receptacle being of a length substantially equal to the length of a teat with the lower end of the teat located at the lower end of the teat receptacle when the latter is in position on a teat, said receptacle being formed of flexible, elastic material and having its inner end closed except for a milk aperture to form an abutment seat and thereby support the teat at its tip end, a flexible collar extending outwardly from the receptacle to the shell to support the receptacle for endwise reciprocatory movement with respect to the shell, said collar forming the sole connection between the receptacle and shell.

ALFRED C. WEIBY.

REFERENCES CITED

The following references are of record in the file of this patent:

UNITED STATES PATENTS

| Number | Name | Date |
|---|---|---|
| 1,705,292 | Horthy et al. | Mar. 12, 1929 |

FOREIGN PATENTS

| Number | Country | Date |
|---|---|---|
| 367,297 | Great Britain | Feb. 18, 1932 |
| 441,950 | Great Britain | Jan. 30, 1936 |